March 10, 1942.  R. L. PERRIN  2,275,551
END GATE LOCK
Filed Oct. 14, 1940
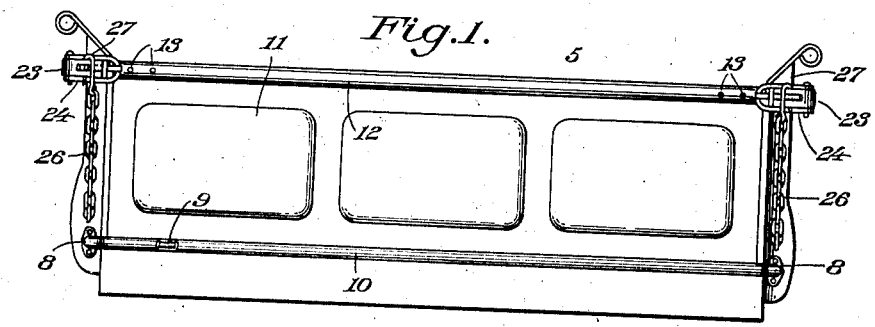
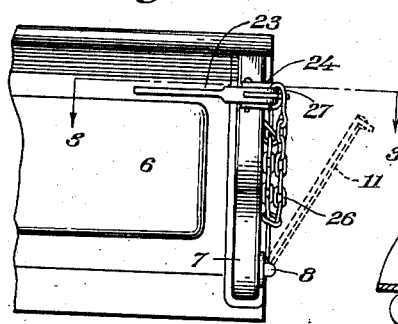
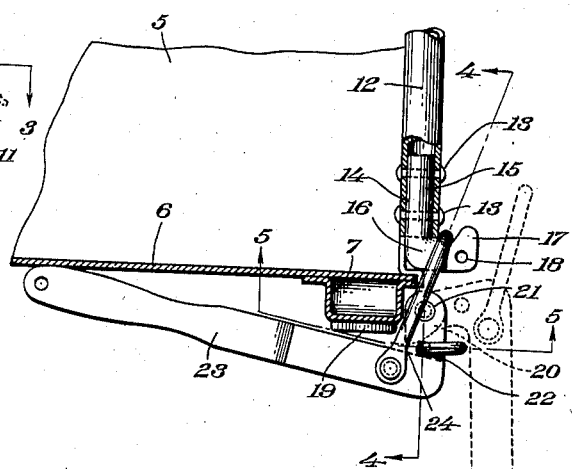
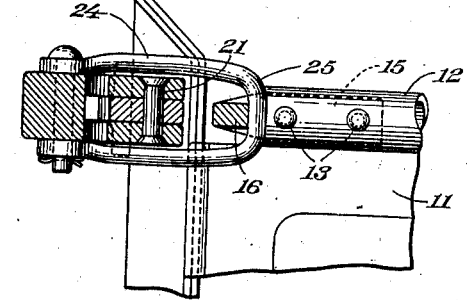
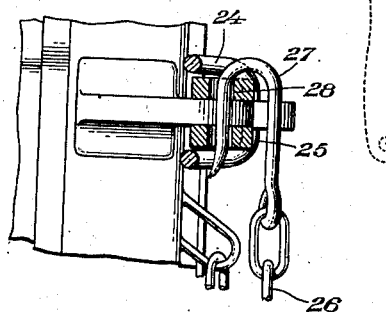
Robert L. Perrin,
INVENTOR
BY Victor J. Evans & Co.
ATTORNEYS Patented Mar. 10, 1942

2,275,551

UNITED STATES PATENT OFFICE 2,275,551

ENDGATE LOCK

Robert L. Perrin, Conway, Kans., assignor of one-half to Dayton R. Yoder, Conway, Kans.

Application October 14, 1940, Serial No. 361,180

2 Claims. (Cl. 292—247)

My invention relates to tail gate fastening devices for trucks and the like and has as one of the principal objects thereof the provision of a device of the above described character which is so constructed and arranged whereby the tail gate may be quickly secured in closed position and which is equipped with means for insuring the gate being maintained in closed position against accidental operation of the device.

An important object of my invention is to provide a device of the character described which is simple in construction, durable in use, efficient in operation and economical in manufacture.

Other objects and advantages will be apparent from the following description, appended claims and annexed drawing.

Referring to the drawing wherein like reference characters designate like parts throughout the several views:

Figure 1 is an end elevation of a truck body equipped with an end gate having my invention applied thereto.

Figure 2 is a side elevation of the rear end of said truck and illustrating my invention applied thereto for securing the tail gate in closed position.

Figure 3 is a sectional view taken on the line 3—3 of Figure 2.

Figure 4 is a sectional view taken on the line 4—4 of Figure 3.

Figure 5 is a sectional view taken on the line 5—5 of Figure 3.

As illustrated in the drawing, I employ a truck body 5 preferably constructed of metal and which is provided on the outer faces of its sides 6 adjacent its rear end, with vertically extending U-shaped reinforcing members or standards 7, the rear faces of which have fixed thereto, adjacent their lower ends, bearings 8 in which are mounted the ends of a hinge shaft 9 extending through a hinge sleeve 10 fixed to the lower end of a tail gate 11 for closing the open rear end of said truck body. The upper end of the gate 11 is formed with a rolled edge constituting a sleeve 12 and in the ends of which is fixed, by means of rivets 13, aligned end sections 14 of a pair of keepers 15. Said keepers are formed with oppositely disposed right angularly related end sections 16 extending rearwardly away from the sleeve 12 and provided with hook-shaped ends 17 provided with openings 18.

Secured to the side faces of the members 7, adjacent their upper ends, are brackets 19 having rearwardly and right angular disposed end portions 20 extending toward the gate 11. The end portions 20 have pivoted thereto, by means of pivot pins 21, the substantially right angularly disposed bifurcated end sections 22 of a pair of levers 23, the latter extending forwardly and inwardly with respect to the truck body when the tail gate is in closed position. Adjacent the end sections 22, the handles have pivoted thereto the free ends of U-shaped links 24, the cross portions 25 of which are disposed in connected relation within the hook-shaped ends 17 of the keepers 15. When the links 24 are thus disposed, the links extend in planes interposing the rear faces of the members 7 and the axes of the pins 21 thereby securing the tail gate in closed position until such times as the levers are pivoted outwardly with respect to the truck body and the links are disposed out of engagement with the keepers to permit the gate to be operated to open position.

Fixed to the members 7 are the ends of a pair of chains 26, the opposite ends of which are provided with hooks 27 detachably disposed through openings 28 formed in the sections 22 of the levers 23. The hooks, by engaging the links 24 when connected to the keepers 15, preclude outward pivoting of the levers 23 until said hooks are removed from said openings 28. When the gate is in open position, the hooks 27 are disposed through the openings 18 of the keepers whereby to support the upper or outer end of said gate by the chains 26 in the usual manner.

Without further elaboration the foregoing will so fully explain the invention that others may, by applying current knowledge, readily adapt the same for use under various conditions of service. Moreover, it is not indispensable that all the features of the invention be used conjointly since they may be employed advantageously in various combinations and sub-combinations. It is obvious that the invention is not confined to the herein described use therefor as it may be utilized for any purpose to which it is adaptable. It is therefore to be understood that the invention is not limited to the specific construction as illustrated and described as the same is only illustrative of the principles of operation, which are capable of extended application in various forms, and that the invention comprehends all construction within the scope of the appended claims.

What I claim is:

1. A tail gate fastening device for a truck body having reinforcing channels arranged vertically at the rear side portions and a tail gate having its lower portion pivotally connected to the reinforcing channels, comprising a keeper hook attached to the upper portion of the tail gate adjacent each end, a horizontally disposed support bracket attached to each reinforcing channel at the rear of the body, an angular fastening lever pivotally connected to each support bracket, the said lever having a relatively long handle portion and a short bifurcated knuckle portion projecting inwardly from one end of the handle at an acute angle therewith, a U-shaped link pivotally connected to the lever handle adjacent its juncture with the knuckle portion, the said link being adapted to engage the keeper hook at each end of the tail gate in locking position, the said knuckle portion of the lever being provided with an aperture therethrough spaced inwardly from the pivot connection of the knuckle with the support bracket, and a hook removably inserted in the said aperture in the knuckle portion in a position outwardly of the link to preclude opening swinging movement of the link and to retain the lever with the knuckle portion disposed transversely and the handle portion arranged at an inclination to and the outer end portion held against the side of the truck body.

2. A tail gate fastening device for a truck body having vertical side walls and a tail gate at the rear end of the body with its lower end pivotally connected with the body, comprising a laterally projecting keeper hook fastened to the upper portion of the tail gate at each end, a horizontally disposed support bracket at each side of the truck body, an acute angled lever pivotally connected with each support bracket and arranged horizontally on the body, the said lever having a relatively short knuckle portion pivotally connected with the support bracket and extending laterally of each side wall in locking position, the said lever also having a relatively long handle portion disposed at an acute angle with the knuckle portion, a U-shaped link pivotally connected with the handle portion of the lever just inward of the connection of the knuckle portion therewith, the said link being adapted to engage the keeper hook at each end of the tail gate in gate fastening position, the said lever having an aperture through the knuckle portion adjacent its juncture with the handle portion, and a hook removably inserted in the aperture in the knuckle at one side of the link so as to obstruct movement of the link and opening movement of the lever for locking the latter in gate fastening position.

ROBERT L. PERRIN.